Feb. 2, 1971 SHIN-ICHI KAMACHI 3,560,862
SYSTEM FOR DETECTING THE MALFUNCTION IN A DETECTING
DEVICE OF A DISPLACEMENT
Filed Nov. 25, 1968 2 Sheets-Sheet 1
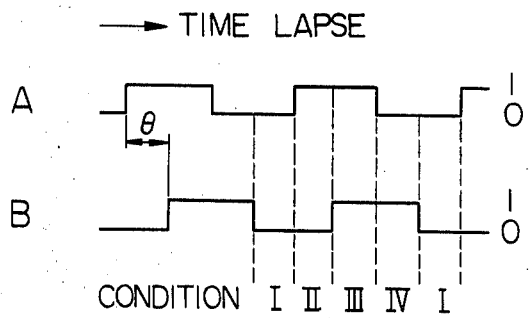
Fig. 1
PRIOR ART
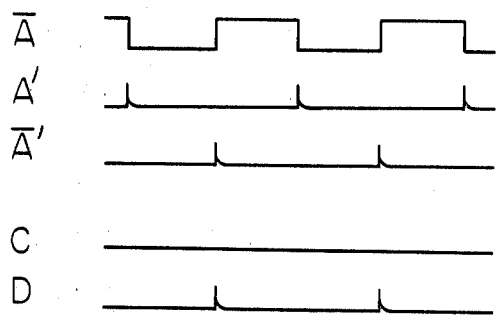
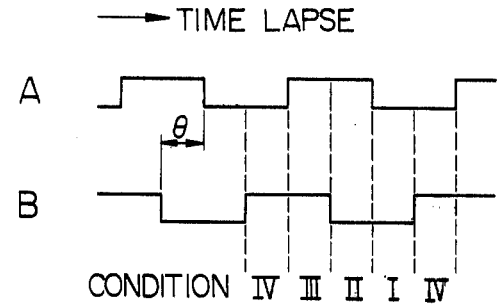
Fig. 2
PRIOR ART
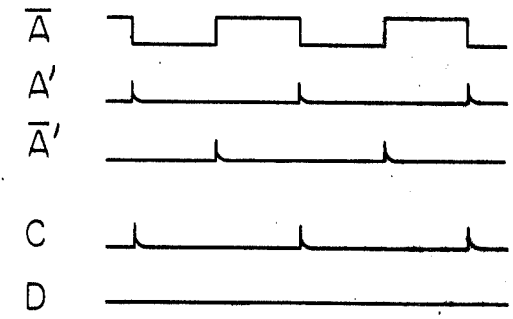
INVENTOR
SHIN-ICHI KAMACHI
ATTORNEY United States Patent Office 3,560,862
Patented Feb. 2, 1971

3,560,862
SYSTEM FOR DETECTING THE MALFUNCTION IN
A DETECTING DEVICE OF A DISPLACEMENT
Shin-Ichi Kamachi, Tokyo, Japan, assignor to Olympus
Optical Co., Ltd., Tokyo, Japan
Filed Nov. 25, 1968, Ser. No. 778,622
Int. Cl. H03b 3/04
U.S. Cl. 328—92     5 Claims

ABSTRACT OF THE DISCLOSURE

System for detecting the malfunction in a measuring device of a displacement utilizing at least one cyclically varying signal having a first and second sign in each cycle thereof and produced in response to the displacement to be measured comprising the steps of detecting three cyclically varying signals including the first mentioned at least one cyclically varying signal each having the same cyclic period but their phases shifted relatively from each other, and detecting two conditions among the eight conditions in the combination of the first or second sign in the three signals.

The above described two conditions will never appear in the normal function of the three signals in response to the displacement while the six other conditions in the combination will necessarily take place during the normal function of the signals, thereby permitting the malfunction of the signals to be positively detected by inspecting the occurrence of the above described two conditions.

BACKGROUND OF THE INVENTION

The present invention relates to a system for detecting the malfunction in a detecting device such as a measuring device of a displacement by utilizing cyclically varying signals produced in response to the displacement to be detected.

In a detecting device such as a measuring device of a length or an angle utilizing a cyclically varying signal such as moire fringes generated by two superposed diffraction gratings movable relatively to each other in response to the displacement of an object or a measuring head of the measuring device by which the length or the angle is measured, the measured value is usually indicated digitally by counting the number of pulses derived from the movement of the signal which corresponds to the displacement to be detected by using an electronic counting device. In this case, it is necessary to carry out the addition or the subtraction of the number of pulses in accordance with the sense of the direction in which the displacement takes place, i.e., the linear or angular displacement in the positive or negative sense. In order to detect the sense of the direction of the displacment, a method has been usually carried out in which, in addition to a cyclically varying signal having a phase which varies in accordance with the displacement, another cyclically varying signal having the same cyclical period as the above mentioned signal but having its phase shifted relatively thereto is produced, and the sense of the advance of the phase of the signal is detected by inspecting the relation of the change in one signal with respect to that in the other signal.

Heretofore, in measuring digitally a displacement by using such a prior art method, however, it has been neither possible nor carried out to detect the possible occurrence of the malfunction of the signal for some reasons in case such a malfunction takes place in any one or both of the signals. Thus, the reliability of the result obtained by this method depends solely upon the reliability of the detecting device per se.

The present invention aims at avoiding the above described disadvantages of the prior art method for measuring the displacement and providing a novel and useful system for detecting the malfunction of the signals used therein so as to positively ascertain the correctness of the results obtained by the system without depending merely upon the reliability of the elements utilized in carrying out the system.

SUMMARY OF THE INVENTION

The object of the present invention is to provide a novel and useful system for detecting the malfunction in a detecting device of a displacement such as a measuring device of a length or an angle by which the above described disadvantages of the prior art is avoided and positively insures the correctness of the results obtained.

The object of the present invention is achieved in accordance with the present invention by providing three cyclically varying signals including the one used in detecting the displacement varied in accordance with the displacement and having the same cyclical period but different phase from each other, and detecting the two conditions of the combination of the three signals which are distinguished from the six conditions of the combination of the three signals taking place in the proper function thereof thereby permitting the malfunction of either one or more of the three signals to be detected by the occurrence of the above described two conditions of the three signals.

In order to more clearly describe the characteristic feature of the present invention, preferred embodiments of the present invention will be set forth below in comparison with the prior art method with reference to the accompanying drawings illustrating the prior art method as well as the preferred embodiment of the present invention.

BRIEF DESCRIPTION OF THE DRAWINGS

FIG. 1 is a diagram showing the prior art method for detecting the sense of the displacement to be detected by using two cyclically varying signals which vary in accordance with the displacement and have the same cyclic period but different phases from each other;

FIG. 2 is a view similar to FIG. 1 but showing the variation in the signals when the sense of the direction in which the displacement takes place is opposite to that shown in FIG. 1;

DETAILED DESCRIPTION OF THE PREFERRED EMBODIMENTS

Figure 3:
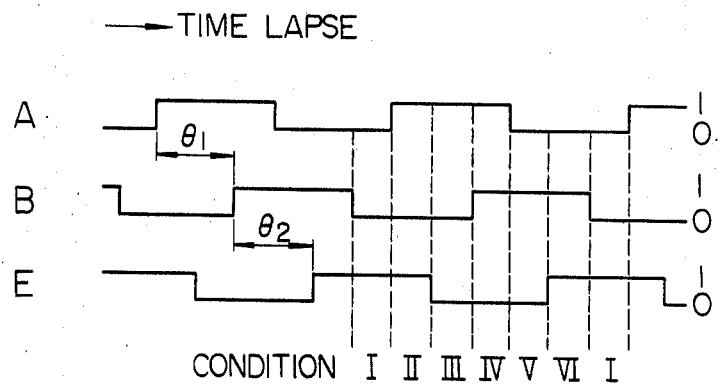
FIG. 3 is a diagram similar to FIG. 1 but showing the system for detecting the sense of the direction of the displacement in accordance with the present invention.

Referring to FIGS. 1 and 2 illustrating the prior art method for detecting the malfunction of the detecting device of a displacement, cyclically varying signals A, B each having, for example, positive sign 1 and zero sign 0 in each cycle thereof are produced which vary in accordance with the displacement to be detected and which have the same cyclic period but with their phases shifted by $\theta$ from each other. FIG. 1 shows that signal A is in advance of the signal B in the phase by $\theta$ corresponding, for example, to the positive sense of the direction in which the displacement takes place, while the signal B is in advance of the signal A by $\theta$ in FIG. 2, corresponding to the negative sense of the direction in which the displacement takes place.

In order to detect the fact that the displacement takes place in the positive sense by using the two signals A, B shown in FIG. 1, an inverted signal $\bar{A}$ is produced from the signal A, for example, and the positive differential pulses A' and $\bar{A}'$ are produced from the signals A and $\bar{A}$, respectively. An "and" signal C is produced from the positive differential pulses A' and the other original signal B while another "and" signal D is produced from the other positive differential pulses $\bar{A}'$ and the signal B.

Then, cyclically occurring output pulses corresponding to the displacement take place in the "and" signal D while no output pulses occur in the "and" signal C, because the positive differential pulses $\bar{A}'$ take place during the period the positive sign 1 takes place in the signal B while the positive differential pulses A' do not take place during the period the positive sign 1 takes place in the signal B.

In like manner, when the signal B is in advance of the signal A as shown in FIG. 2, no output pulses take place in the "and" signal D contrary to the case of FIG. 1 while output signals occur in the "and" signal C for the same reason as described above.

Thus, the sense of the direction in which the displacement takes place can be detected by inspecting in which "and" signals the output pulses take place and the displacement to be detected can be indicated digitally by counting the number of the output pulses occurring during the displacement.

In such a method, however, it is impossible to detect the possible occurrence of the malfunction in any one or both of the original signals A, B for the reason as set forth below.

As described previously, it is assumed for convenience that a positive sign 1 and a zero sign 0 take place in each of the cycles of the signals A, B. Then, four conditions I, II, III and IV are obtained from the combination of either one of the signs 1, 0 in one of the signals A, B with either one of the signs 1, 0 in the other of the signals A, B as indicated in Table 1.

TABLE 1

| A | B | Condition |
|---|---|-----------|
| 0 | 0 | I |
| 1 | 0 | II |
| 1 | 1 | III |
| 0 | 1 | IV |

The order of the sequential occurrence of these four conditions of the combination of the signs 1, 0 of the signals A, B is $I \to II \to III \to IV \to I$ when the displacement takes place in the positive sense as shown in FIG. 1, while the order is reversed to $IV \to III \to II \to I \to IV$ when the displacement takes place in the negative sense as shown in FIG. 2.

Therefore, insofar as the signals A, B are being properly produced, the above described sequential occurrence of the four conditions of the combination of the signs 1, 0 takes place thereby permitting the proper operation of the signals to be ascertained.

Should a malfunction take place in either one of the two signals A, B so that either one of the signs 1, 0 is kept unchanged in one of the signals A, B despite the displacement taking place in either one of the positive and negative senses, then the output pulses will occur alternately in both the "and" signals C, D in the period half a cycle of the signals A, B or no output pulses will take place in any of the two "and" signals C, D, thereby making it impossible to obtain proper occurrence of the output pulses corresponding to the displacement.

The same applies in case both the signals A, B do not function properly or either one of the signs 1, 0 is kept unchanged in both the signals A, B despite the displacement taking place in either of the positive and negative senses.

In other words, when $A=0$ and B operates properly, or when $A=1$ and B operates properly, or when $B=0$ and A operates properly, then no output pulses will take place in any of the "and" signals C, D. And when $B=1$ and A operates properly, then the output pulses will take place alternately in both the "and" signals C, D.

On the other hand, when $A=0$ and B operates properly, then the sequential occurrence of the conditions of the combination of the signs 1, 0 will be $I \to IV \to I \to IV$, and when $A=1$ and B operates properly, then the sequential occurrence of the conditions of the combination will be $II \to III \to II \to III$. In like manner, when $B=0$ and A operates properly, then the sequential occurrence of the conditions of the combination will be $I \to II \to I \to II$, and when $B=1$ and A operates properly, then the sequential occurrence of the conditions of the combination will be $III \to IV \to III \to IV$.

These malfunctions in the sequential occurrence of the conditions of the combination of the signs 1, 0 cannot be distinguished from that of the proper function of the signals A, B. Therefore, correct results cannot be expected by the prior art method when the malfunction takes place which cannot be detected.

In like manner, the condition under which both A and B do not properly operate correspondingly to the displacement cannot be distinguished from the condition under which no displacement takes place.

The above described disadvantages of the prior art method are due to the fact that only two signals with their phases shifted relatively to each other are used.

The present invention overcomes the above described disadvantages by providing a further signal in addition to the two signals heretofore used in detecting the sense of the direction in which the displacement takes place, the above described additional signal having its phase shifted relatively to each of the other two signals.

Now the present invention will be described in detail with reference to FIG. 3.

FIG. 3 shows three cyclically varying signals A, B and E each having the same cyclical period and having a positive sign 1 and a zero sign 0, for example, in each of their cycle. As seen from FIG. 3, the signal A is in advance in phase of the signal B by $\theta_1$, while the signal E is in retard of the signal B by $\theta_2$.

The conditions of the combination of the signs 1, 0 of the signals A, B and E are indicated in Table 2.

TABLE 2

| A(A') | B(E') | E(B') | Condition |
|-------|-------|-------|-----------|
| 0 | 0 | 1 | I |
| 1 | 0 | 1 | II |
| 1 | 0 | 0 | III |
| 1 | 1 | 0 | IV |
| 0 | 1 | 0 | V |
| 0 | 1 | 1 | VI |
| 0 | 0 | 0 | VII |
| 1 | 1 | 1 | VIII |

The order of the sequential occurrence of the conditions of the combination of the signs 1, 0 of the three signals A, B and E can then be expressed as $$I \to II \to III \to IV \to V \to VI \to I$$

using the symbols shown in Table 2.

It is apparent that the order of the sequential occurrence of the conditions of the combination of the signs 1, 0 will be reversed from the above order when the displacement takes place in the opposite sense to that shown in FIG. 3, i.e. when the signal A is in retard of the signal B while the signal E is in advance of the signal B.

Thus, insofar as the three signals A, B and E function properly, the above six conditions I to VI take place in the order determined in accordance with the sense of the direction of the displacement and the conditions VII and VIII will never take place. Therefore, if either of the conditions VII and VIII takes place, it means that at least one of the three signals A, B and E does not operate properly.

In other words, each of the conditions I to VI can be said as being a binary number having one or two signs 1 i.e. having the weight of 1 or 2 when expressed in terms of binary system, while the conditions VII and VIII are binary numbers having the weight of either 0 or 3.

Therefore, the conditions in which the binary number having the weight of either 0 or 3 takes place indicates that the malfunction is taking place.

By the detecting system in accordance with the present invention as described above, when any one of the three signals A, B and E does not properly function in accordance with the displacement and either of the signs 1 or 0 is kept stationary, then the condition in which the binary number having the weight of either 0 or 3 takes place will necessarily occur. Therefore, the malfunction can be positively detected.

In other words, when $A=0$ and the other two B, E operate properly, for example, the condition III having the binary number 100 is changed to 000 which is the condition VII. In like manner, when $A=1$ and the other two B, E operate properly, for example, the condition VI having the binary number 011 is changed to 111 which is the condition VIII.

The same applies in the case in which B or E is kept unchanged while the other two operate properly.

When the malfunction takes place simultaneously in two of the three signals so that the sign 1 or 0 remains unchanged in both the above two signals while the remaining one signal operates properly, then the condition VIII or VII will necessarily take place thereby permitting the malfunction to be detected.

Should, however, the signal 1 remain unchanged in one of the two signals while the signal 0 remains unchanged in the other of the two signals and the remaining one of the three signals operates properly, then the conditions in which the weight of the binary number becomes 0 or 3 will not take place so that the malfunction of the signals cannot be detected by the above system.

Further, should the malfunction take place simultaneously in all the three signals, the detection of the malfunction can be achieved only in such cases in which the weight of the binary number becomes 0 or 3.

However, the malfunction of the signals takes place in general very rarely, and, in almost all cases, the malfunction will take place first only in one signal, if such occurs, thereby permitting the occurrence of the malfunction to be detected. Therefore, the above described simultaneous occurrence of the malfunction in two or three signals is practically unnecessary to be taken into consideration insofar as it is desired to provide a practically effective system for detecting the malfunction of the signals used in the detecting device.

Therefore, it can be said that the present invention provides a practically complete system for detecting the malfunction of the signals.

Figure 4:
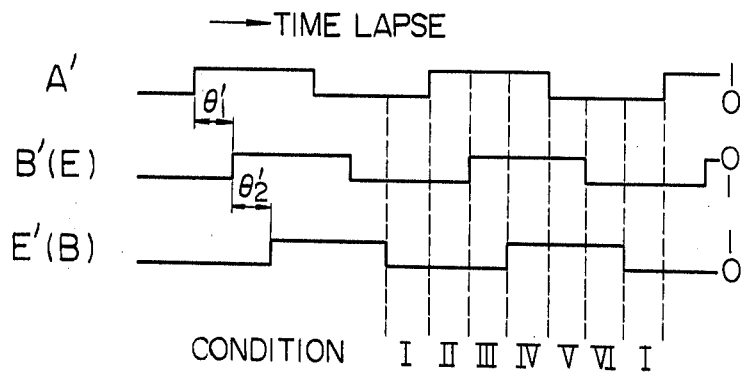
FIG. 4 is a diagram similar to FIG. 3 but showing an alternative embodiment of the present invention.

FIG. 4 shows three signals A', B' and E' similar to the signals A, B and E in FIG. 3. In this case, however, either one or both of the phase difference $\theta'_1$ and the phase difference $\theta'_2$ are smaller than the respective $\theta_1$ and $\theta_2$, so that the amount of the sum $\theta'_1 + \theta'_2$ is smaller than the half cycle of the signal. In the case shown in FIG. 4, the signal B' which is positioned intermediate the other two signals A' and E' is given the signals 1, 0 at positions contrary to those in the signal B. In other words, the signal B' is inverted so as to shift the phase thereof by half a cycle. In FIG. 4, the signs 1, 0 of the signal B' are shown in reversed positions with respect to those in the FIG. 3. Then, the signal B' can be regarded as being the signal E in FIG. 3 while the signal E' is considered to correspond to the signal B, the signal A' corresponding to the signal A.

Thus, the conditions of the combination of the signals 1, 0 of the three signals A', B' and E' can be expressed as shown in Table 2.

Therefore, the malfunction taking place in the signals A', B' and E' shown in FIG. 4 can be detected in the same manner as in the case of the signals A, B and E shown in FIG. 3.

It is apparent that the sense of the direction in which the displacement is taking place can be detected by using two of the three signals in like manner as in the prior art method described previously.

Figure 5:
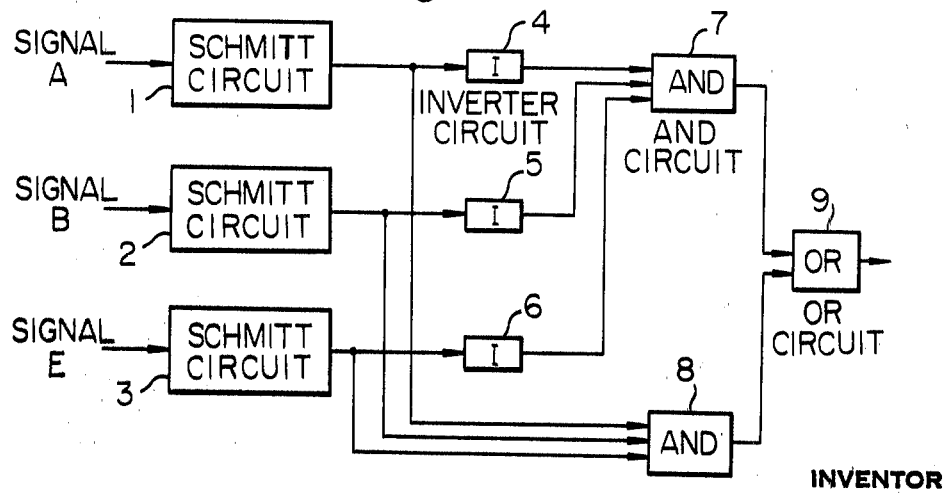
FIG. 5 is a schematic view showing the circuit to be used in carrying out the present invention.

Finally, FIG. 5 shows an example for carrying out the system of the present invention.

In FIG. 5, the three signals A, B and E are connected to the respective Schmitt circuits 1, 2 and 3 so as to generate a positive voltage output each time the sign 1 of each of the signals is supplied thereto, while low voltage output is generated each time the sign 0 of each of the signals is supplied. Inverter circuits 4, 5 and 6 are connected to the output of the Schmitt circuits 1, 2 and 3, respectively, so that an inverted output is generated by each of the inverter circuits 4, 5 and 6. The outputs of the inverter circuits 4, 5 and 6 are connected together to an "and" circuit 7 while another "and" circuit 8 is connected to the outputs of the Schmitt circuits 1, 2 and 3 in parallel to the respective inverter circuits 4, 5 and 6 as shown in FIG. 5. The outputs of the "and" circuits 7 and 8 are connected together to an "or" circuit 9.

Thus, the output of the "and" circuit 7 indicates the occurrence of the condition VII while the output of the "and" circuit 8 indicates the occurrence of the condition VIII. Therefore, the malfunction of the signals can be detected by inspecting the output of the "or" circuit 9.

As described above, the present invention provides a novel and useful system for positively and exactly detecting the malfunction in the detecting device of a displacement while it enables to detect the sense of the direction in which the displacement is taking place.

I claim:

1. System for detecting the malfunction in a measuring device of a displacement utilizing at least one cyclically varying signal produced in response to said displacement to be measured, the improvement comprises the steps of detecting three cyclically varying signals including said at least one cyclically varying signal and each having the same cyclic period but having their phases shifted relatively from each other; and detecting two conditions in the combination of said three signals distinguishing them from six other conditions in the combination of said three signals taking place in the proper function of said three signals.

2. System according to claim 1, wherein each of said three signals produces alternately a first and a second sign in each of the cycles thereof, and the weight of said two conditions in the combination of said three signals is either 0 or 3 assuming that either one of said first and second signs is 0 while the other is 1, whereas the weight of said six other conditions in the combination of said three signals taking place in the proper function of said three signals is either 1 or 2.

3. System according to claim 1, wherein one of said three signals having its phase located intermediate the other two signals is inverted when the sum of the phase differences between the three signals is less than the half cycle thereof, said two conditions to be detected being derived from the combination of said inverted signal and said other two signals.

4. System according to claim 2, wherein a voltage output is produced from either one of said first and second signals of each of said three signals, each of said voltage outputs being introduced together into a first "and" circuit so as to detect the occurrence of either one of said two conditions in the combination of said three signals indicating the malfunction of any one or more of said three signals from the output thereof while each of said voltage outputs is shunted so as to be inverted so that the thus produced inverted voltage outputs are introduced together into a second "and" circuit thereby permitting the occurrence of the other of said two conditions to be detected from the output thereof, said outputs of said first and second "and" circuits being introduced together into an "or" circuit thereby permitting either of said two conditions indicating the malfunction of said three signals to be detected from the output of said "or" circuit.

5. System for detecting the malfunction in a measuring device of a displacement utilizing at least one cyclically varying signal having a first and a second sign in its cycle and produced in response to said displacement to be measured the improvement comprises, in combination, means for producing three cyclically varying signals including said at least one signal each having the same cyclical period and the first and second sign in the cycle thereof but with their phases shifted relatively from each other, means for producing a voltage output from either one of said signs of each of said three signals in response to the cycle thereof; a first "and" circuit receiving the respective voltage output from each of said means for producing said voltage outputs; inverter circuits each receiving said voltage output from each of said Schmitt circuits in parallel to said first "and" circuit so as to produce an inverted voltage output with respect to said first mentioned voltage output; a second "and" circuit receiving said respective inverted voltage output from each of said inverter circuits; and an "or" circuit receiving the outputs from said first and second "and" circuits, thereby permitting the malfunction of either one or more of said three signals to be detected by detecting the occurrence of the simultaneous occurrence of either of said voltage outputs derived from said Schmitt circuits or said inverted voltage outputs derived from said inverter circuits.

References Cited
UNITED STATES PATENTS

| | | | |
|---|---|---|---|
| 3,028,589 | 4/1962 | Broadwell | 324—83(D)UX |
| 3,114,109 | 12/1963 | Melas | 328—92X |
| 3,234,373 | 2/1966 | Sellers, Jr., et al. | 307—218X |
| 3,437,956 | 4/1969 | Davis | 307—218X |
| 3,482,171 | 12/1969 | Himes et al. | 307—232X |

STANLEY T. KRAWCZEWICZ, Primary Examiner

U.S. Cl. X.R.

307—210, 218; 324—83; 328—109, 133